(12) United States Patent
Priest

(10) Patent No.: US 9,288,962 B2
(45) Date of Patent: Mar. 22, 2016

(54) LOW-SLIP HIGH-CAPACITY TEAT CUP LINER

(71) Applicant: Steven Brent Priest, Christchurch (NZ)

(72) Inventor: Steven Brent Priest, Christchurch (NZ)

(*) Notice: Subject to any disclaimer, the term of this patent is extended or adjusted under 35 U.S.C. 154(b) by 446 days.

(21) Appl. No.: 13/667,920

(22) Filed: Nov. 2, 2012

(65) Prior Publication Data

US 2014/0123903 A1    May 8, 2014

(51) Int. Cl.
*A01J 5/04* (2006.01)
*A01J 5/08* (2006.01)

(52) U.S. Cl.
CPC .......................................... *A01J 5/08* (2013.01)

(58) Field of Classification Search
CPC ................. A01J 1/00; A01J 5/06; A01J 5/08; A01J 5/16; A01K 1/12
USPC ............................................ 119/14.47–14.53
See application file for complete search history.

(56) References Cited

U.S. PATENT DOCUMENTS

| | | | | |
|---|---|---|---|---|
| 2,079,435 A * | 5/1937 | Laurits | .......................... | A01J 5/08 119/14.49 |
| 2,340,296 A * | 2/1944 | Bender | ...................... | 119/14.02 |
| 3,079,891 A * | 3/1963 | Miller | ........................ | 119/14.5 |
| 3,999,516 A * | 12/1976 | Shulick | ....................... | 119/14.1 |
| 4,324,201 A * | 4/1982 | Larson | ....................... | 119/14.51 |
| 4,745,881 A * | 5/1988 | Larson | ....................... | 119/14.51 |
| 4,869,205 A * | 9/1989 | Larson | ....................... | 119/14.51 |
| 5,069,161 A * | 12/1991 | Pera | ......................... | A01J 5/08 119/14.47 |
| 5,572,947 A | 11/1996 | Larson | | |
| 6,164,243 A | 12/2000 | Larson | | |
| 6,742,475 B1 * | 6/2004 | McLeod et al. | ............ | 119/14.49 |
| 6,745,718 B1 | 6/2004 | Chowdhury | | |
| 7,578,260 B2 | 8/2009 | Shin | | |
| 2015/0114298 A1 * | 4/2015 | Alveby | ..................... | A01J 5/08 119/14.02 |

* cited by examiner

*Primary Examiner* — Kristen C Hayes
*Assistant Examiner* — Ebony Evans
(74) *Attorney, Agent, or Firm* — Vincent G. LoTempio; Kloss, Stenger & LoTempio; David Stephenson

(57) ABSTRACT

A hot stone therapy and acupressure roller including a specially designed rod where hollow, cylindrical stones, along with acupressure pins, are spaced along the rod. As the rod is applied to the body, the attached stones roll and acupressure may be applied. Targeted acupressure can be applied on either side of the rod, and the acupressure pins serve to hold the cylindrical stones and spacers in place. The stones can be inserted onto the rod or used individually. The stones can be used to conduct a cold and/or hot stone massage. Additionally, each end of the rod is shaped for use as a massage tool. When using either end of the rod as a massage tool, the acupressure pins serve to improve grip and increase leverage.

19 Claims, 7 Drawing Sheets

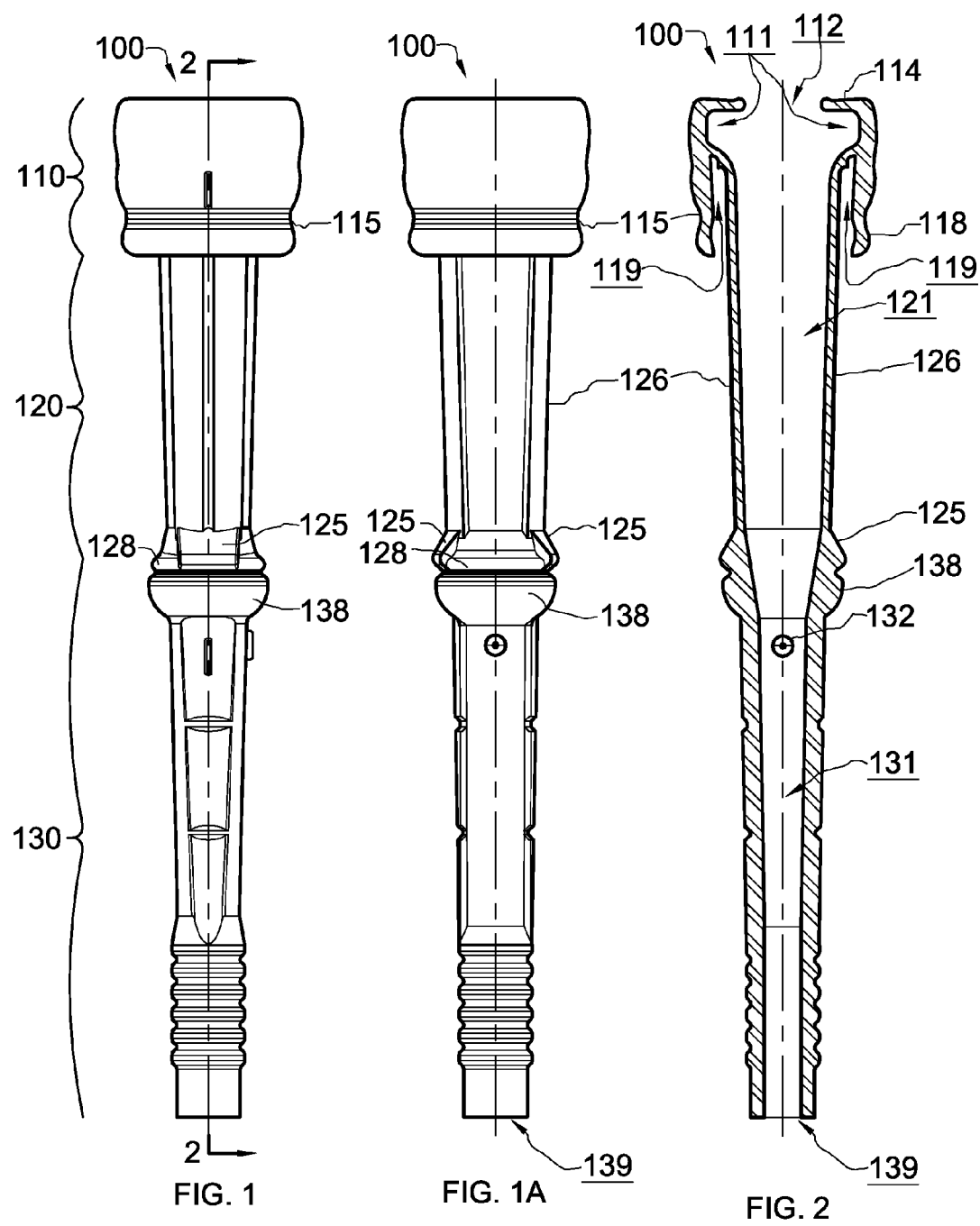

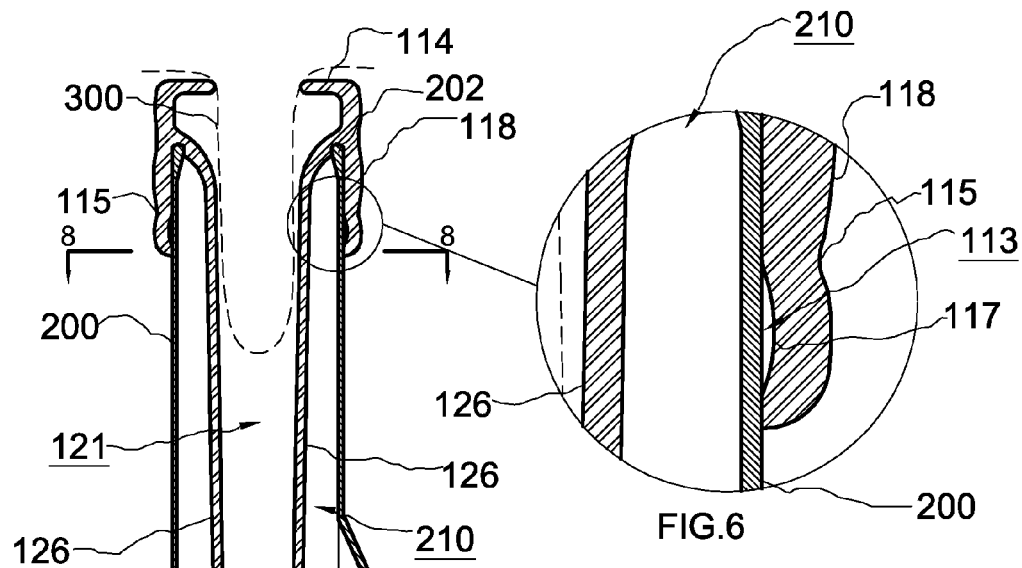
FIG.4
FIG.6
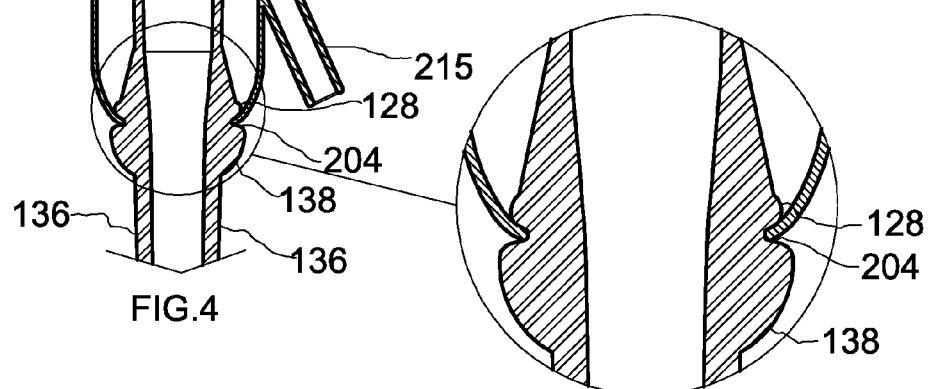
FIG. 5
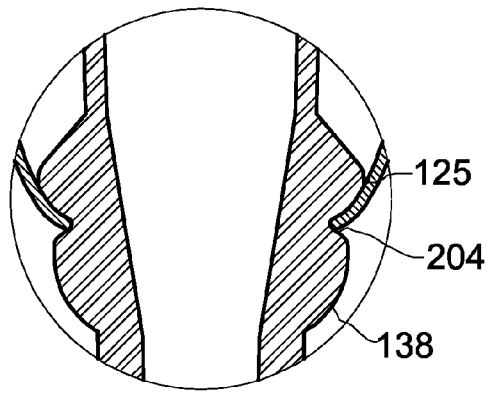
FIG. 5A

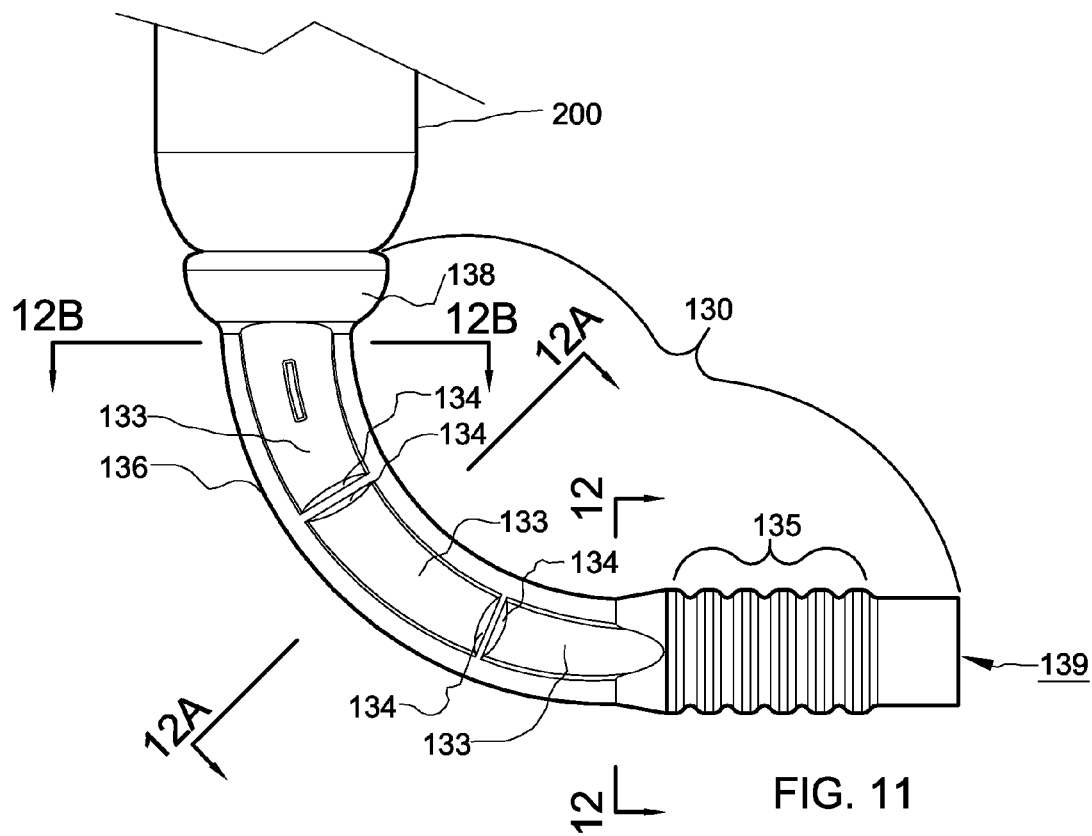
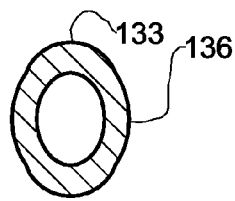
FIG. 12B
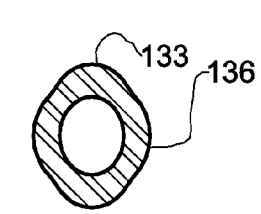
FIG. 12A
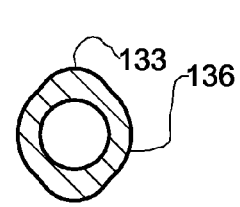
FIG. 12

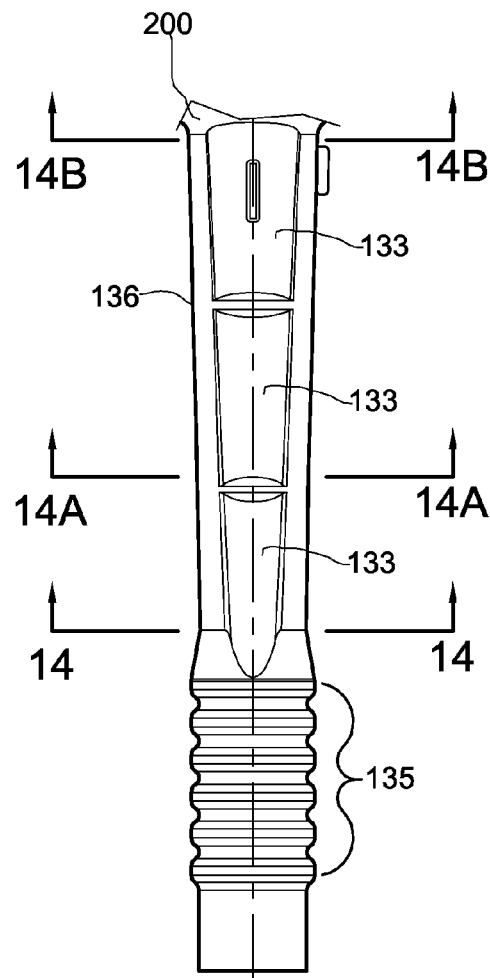
FIG. 13
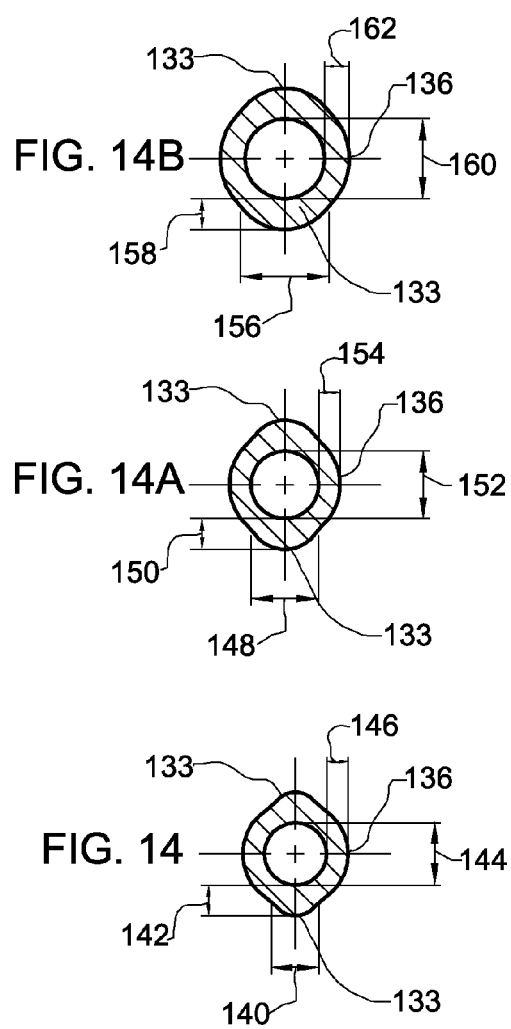

LOW-SLIP HIGH-CAPACITY TEAT CUP LINER

BACKGROUND OF THE INVENTION

1. Field of the Invention

This patent application relates to a teat cup liner for vacuum operated automatic milking machines.

2. Background

Conventional automatic milking machines utilize teat cup assemblies for milking mammals, such as cows. The teat cup assembly has a hollow, rigid outer shell or cup adapted to be attached to a pulsating vacuum line, and a resilient, tubular liner or inflation installed within the shell in a manner to form a seal at both ends of the shell and define a chamber between the shell and the inflation.

The typical inflation includes an upper portion having a teat receiving mouth, a vacuum chamber and upper vacuum channel or barrel which is housed in the shell, and a lower short milk tube section which extends downwardly out of the shell and is attached to a milk claw for collecting milk. An animal's teat is inserted into the receiving mouth and extends into the vacuum chamber and barrel. The mouth, vacuum chamber and barrel are each sealingly engaged with the upper and lower ends of the shell to form an annular chamber surrounding the barrel between the shell and the barrel. The shell is attached to a pulsating vacuum line causing the pressure in the annular chamber to alternate between sub-atmospheric and atmospheric pressure. A vacuum maintained in the milking claw causes a constant vacuum to be applied to the inside of the liner. The vacuum draws the milk from the teat through the short milk tube while the alternating pressure in the annular chamber creates a teat massaging action as the vacuum chamber and barrel collapses onto the teat stopping milk flow when fully collapsed and initiating milk flow when open.

Typically milking teat liners are composed of elastomeric materials, such as natural or synthetic rubber or silicone rubber, due to the resilient nature of such materials. For instance, rubber liners are capable of recovering their original size and shape after repeated deformation. Natural or synthetic rubber compositions are more resistant to tearing or ripping, but are subject to attack by oils, butterfats, teat treatment preparations and other chemicals used in the milking process. On the other hand, silicone rubbers are substantially less vulnerable to attack by such chemicals leading to a relatively longer useful life, but silicone rubber tends to tear and puncture more easily than natural or synthetic rubber.

U.S. Pat. No. 6,164,243 to Larson describes a milking inflation which has a generally triangular suction sleeve. Each side of the generally triangular suction sleeve has a convex cross-section. The convex cross-section allows the sleeve to collapse on the teat at a more consistent time-frame as opposed to a straight-side triangular shape where the center of each face would contact the teat before the vertices. Although the convex cross-section improves performance, the tight vertices of the triangle resist collapse thereby limiting the sleeve contact with the teat. This lack of contact reduces milking efficiency.

U.S. Pat. No. 7,578,260 to Shin provides a milking liner having a short milk tube with external ribs running the length of the milk tube to prevent the tube from collapsing under vacuum and to prevent kinking of the milk tube during use and storage. Additional longitudinal ribs run a shortened length of the milk tube proximate the end of the milk tube which connects to the milking claw. The additional ribs further prevent the milk tube from bending and kinking when the milking inflation is connected to the milking claw. While aiding in preventing unwanted kinking of the milk tube, the ribs suffer some significant drawbacks. The plurality of ribs creates an overly rigid milk tube end. This rigidity minimizes the flexibility of the milking tube and prevents necessary flexing of the milk tube when the milking inflation is inserted on an animal's teat. If the animal moves or shifts position, the milking inflation may slip off of the teat preventing milking of the animal. Further, the milk tube's rigidity also increases the possibility that the milk tube will become dislodged from the milking claw during use. Thus, milk extracted from the animal may not be captured by the milking system.

U.S. Pat. No. 6,745,718 to Chowdhury describes a teat liner having a figured mouthpiece to reduce slipping of the liner off of the teat during use. The inner wall of the mouthpiece barrel is provided with an embossed pattern which is used to grip the teat. Numerous possible embossed textures are disclosed. However, embossing the inner wall may aid in preventing a teat from slipping out of the liner, but the textured inner surface may promote damage to the teat and bacteria growth.

U.S. Pat. No. 5,572,947 to Larson calls for two grooves on a short milk tube with a first, upper groove used to promote bending of the tube into a generally 90 degree position while a bottom groove promotes shut off of milk flow. While the grooves allow the short milk tube to be bent and positioned at an extreme angle the '947 patented liner has potential drawbacks. First, the grooves circumscribe the entire tube and structurally form a wall that is thinner in diameter than in the region of the grooves. This thin wall can crack and/or tear, particularly after frequent flexing and pinching of the short milk tube at these locations. Secondly, the grooves described in the '947 patent dictate the position of the milk claw relative to the milking inflation so that the flexing of the short milk tube is controlled and is limited to one optimal location and degree of bending. This "one optimal" position is impractical as the mammal (i.e. cow) can shift position during milking and the position increases the time required to prepare the animals for milking and decreases milking employee efficiency.

Thus, there is clearly an unmet and long-felt need for a low-slip high-capacity teat liner which also has a kink-resistant milk tube without the necessity of a high vacuum level.

SUMMARY OF THE INVENTION

It is accordingly an object of the present disclosure to provide a teat liner possessing both low slip and fast milking properties while operating under low vacuum.

A further object of the present disclosure is to provide a teat liner possessing both low slip and fast milking properties while operating under low vacuum having a head with an extended skirt length which has a concave internal surface to create a suction cup effect for improved sealing of the liner on the shell to reduce twisting or slipping of the liner within the shell during milking.

Still another object of the present disclosure is to provide a teat liner possessing both low slip and fast milking properties while operating under low vacuum having an oval tapered barrel with thick reinforced side walls that run down the full length of the barrel.

Yet another object of the present disclosure is to provide a teat liner having an oval tapered barrel where the thinner longer axes move together to create a touch point at the teat while the thicker, shorter axes resist collapse for longer thereby creating a channel up the side of the barrel where vacuum can continue to feed the vacuum chamber reducing the possibility of the teat from slipping in the mouthpiece of the liner, or breaking the seal between the teat and the liner, during milking.

A further object of the present disclosure is to provide a teat liner having an oval tapered barrel where the thinner longer axes move together to create a touch point at the teat while the thicker, shorter axes resist collapse for longer thereby necessitating a shorter distance to be traveled from oval to collapse and return and thus causing the barrel wall to move faster in response to vacuum pulsation resulting in faster opening and closing and faster milking.

Another object of the present disclosure is to provide a teat liner having two locking wedges located directly above a bottom hackle of the liner to enhance the anti-twist properties of the liner.

And yet a further object of the present disclosure is to provide a teat liner having a short milk tube having an oval external profile and round internal diameter with two or more notches or hinge points along the length of the short milk tube which allows the short milk tube to bend in the natural direction of a milk cluster so that the head of the liner can be at 90 degrees to the tail without the internal through-bore of the short milk tube collapsing or kinking.

The above and other objects are accomplished in accordance with the present disclosure by provision of a low slip and fast milking liner while under low teat-end vacuum comprising a head portion having a skirt, a barrel configured to be housed within a shell, and a short milk tube configured to removably connect to a milking claw of an automatic milking machine. The head of the teat liner secures the liner to the top rim of the shell and has an extended skirt with a concave internal surface for improving the sealing of the liner on the shell while reducing twisting of the liner. A twisted liner restricts the flow of milk through the barrel. The barrel of the teat liner has an oval cross-section creating a pre-collapsed barrel shape. Thick reinforced side walls run down the length of the barrel. The oval cross-section of the barrel results in faster opening and closing of the liner on the teat of an animal thereby providing faster and efficient milking. The teat liner has a short milk tube with an oval external profile and round internal diameter. At least two notches or hinge points along the short milk tube allow the short milk tube to bend at about a 90 degree angle relative to the liner barrel so as to be efficiently positioned to attach to a milk cluster. Ribs running down the length of the short milk tube compress without collapsing thereby allowing the tube to be distorted into an oval cross-section without kinking or otherwise closing the open internal tube. Thus, the head of the liner (into which a teat is inserted) can be bent at an angle of about 90 degrees with respect to the tail of the short milk tube which is connected to a milking claw without restricting milk flow while the liner is on the teat.

BRIEF DESCRIPTION OF THE DRAWINGS

The present disclosure and the manner in which it may be practiced is further illustrated with reference to the accompanying drawings wherein:

FIG. 1 is a side view of one embodiment of teat liner of the present disclosure.

FIG. 1A is a side view of one embodiment of teat liner of the present disclosure shown in FIG. 1 with the teat liner rotated 90 degrees along the long axis of the teat liner.

FIG. 2 is a cross-sectional view of the embodiment of teat liner of the present disclosure taken generally along line 2-2 of FIG. 1.

FIG. 4 shows a cross-sectional view of the barrel portion of an embodiment of teat liner showing the barrel in an uncollapsed condition and charged with a teat within a shell.

FIG. 5 shows an expanded cross-sectional view of the hackles of one embodiment of a teat liner forming a vacuum-tight seal with a shell.

FIG. 5A shows an expanded cross-sectional view of the locking wedges of one embodiment of a teat liner forming a vacuum-tight seal with a shell.

FIG. 6 is an expanded view of the skirt of the head of one embodiment of a teat liner forming a vacuum-tight seal with a shell.

FIG. 11 is a side view of the short milk tube region of a preferred embodiment of a teat liner of the present disclosure showing the teat liner exiting a shell with the distal end of the short milk tube bent at a generally 90 degree angle to the shell.

FIG. 12 is a cross-sectional view of the short milk tube of a preferred embodiment of teat liner of the present disclosure taken generally along line 12-12 of FIG. 11 showing the internal circular shape of the end of the milk tube.

FIG. 12A is a cross-sectional view of the short milk tube of a preferred embodiment of teat liner of the present disclosure taken generally along line 12A-12A of FIG. 11 showing the oval shape of the interior a bent short milk tube.

FIG. 12B is a cross-sectional view of the short milk tube of a preferred embodiment of teat liner of the present disclosure taken generally along line 12B-12B of FIG. 11 showing the oval shape of the interior a bent short milk tube.

FIG. 13 is a side view of a preferred embodiment of a teat liner of the present disclosure showing the short milk tube of the teat liner exiting a shell.

FIG. 14 is a cross-sectional view of the short milk tube of a preferred embodiment of teat liner of the present disclosure taken generally along line 14-14 of FIG. 13 showing the wall thickness, diameter of the opening, width and thickness of the compression rib of the short milk tube.

FIG. 14A is a cross-sectional view of the short milk tube of a preferred embodiment of teat liner of the present disclosure taken generally along line 14A-14 of FIG. 13 showing the wall thickness, diameter of the opening, width and thickness of the compression rib of the short milk tube.

FIG. 14B is a cross-sectional view of the short milk tube of a preferred embodiment of teat liner of the present disclosure taken generally along line 14B-14B of FIG. 13 showing the wall thickness, diameter of the opening, width and thickness of the compression rib of the short milk tube.

DESCRIPTION OF SPECIFIC EMBODIMENTS

Figure 3A:
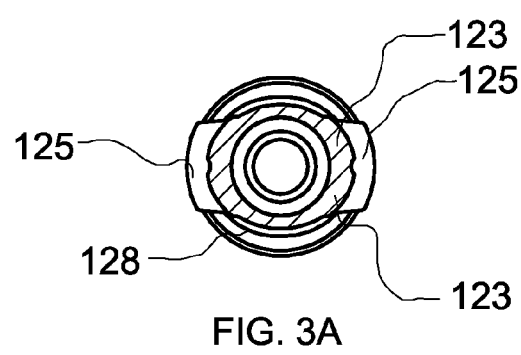
FIG. 3A is a cross-sectional view of the embodiment of teat liner of the present disclosure taken generally along line 3A-3A of FIG. 3.

At the outset, it should be clearly understood that reference numerals are intended to identify the information found in the block diagrams in the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

Adverting now to the drawings, with reference to FIG. 1, a preferred embodiment of a teat liner for milking a mammal, such as a cow, is indicated generally by numeral 100. FIG. 1 is a side view of one embodiment of teat liner of the present disclosure. The teat liner of the present invention is for use with a teat cup assembly which includes a hollow, rigid outer shell or cup adapted to be attached to a pulsating vacuum line. The teat liner of the present disclosure is a resilient, tubular liner or inflation installed within the shell in a manner to form a seal at both ends of the shell and define a chamber between the shell and the inflation. Both low slip and fast milking are considered to be desired features of the liner without a relatively high vacuum level.

Conventional thinking is that high vacuum levels are required to maintain a low slip and fast milking liner. It should be understood that the negative impact of teat damage and poor cow comfort is a side effect of a relatively high vacuum level. The teat liner of the present disclosure is configured so as to allow for milking of a mammal at relatively low vacuum levels while allowing for less slippage and higher milking speeds.

Teat liner 100 is generally comprised of head 110, barrel 120 and short milk tube 130. Head 110 is configured with a circumferentially extending skirt with a concave internal surface to create a suction cup effect for a tighter seal of the liner on the shell to reduce twisting within the shell. Barrel 120 is configured with an oval barrel with reinforced walls having a combination of thicker and thinner walls that mimic a pre-collapsed barrel shape that allow for higher milking speeds. Barrel 120 collapses in a similar manner to a rounded barrel (i.e. one with a thinner longer section moving together to create a touch point), but because it has thicker sidewalls it will resist collapse for a longer period of time creating a channel along the side of the barrel so that the vacuum can continue to feed the vacuum chamber for reduced slip and therefore maintain vacuum stability. The liner of the instant disclosure is operatively configured so that as the thinner barrel wall sections move independently of the thicker sidewalls and have a shorter distance to travel from collapse to return, therefore allowing the barrel to move faster in response to the movement created by the vacuum. This combination of walls effectively opens and closes the liner faster than a conventional liner and a more direct response to pulsation and results in faster milking. This is in direct contravention of conventional thinking that the thicker the barrel wall at the touch point the faster the milk will flow.

FIG. 1A is a side view of the embodiment of the teat liner of the present disclosure shown in FIG. 1 with the teat liner rotated 90 degrees along the long axis of the teat liner relative to FIG. 1. FIG. 1A illustrates the barrel extending from the head to upper hackle 128, and the short milk tube extending from lower hackle 138 to exit orifice 139. The barrel is tapered so its diameter decreases in size as it extends away from the head. Because of the barrel's oval shape the barrel has a greater internal diameter across the major axis than a traditional round barrel to thus accommodate a wider range of teat sizes. Upper hackle 128 has a curved lower surface to provide maximum surface contact with the curved profile of a shell. Locking wedges 125 provide additional surface area between hackle 128 and a shell. The additional surface area in contact with the shell's internal wall created by the locking wedges increases the amount of friction between the liner and shell thereby reducing the twisting of barrel sidewall 126 during a milking operation. The locking wedges are located directly above the bottom hackle to work with the extended concave skirt to enhance the anti-twist feature of the entire liner. The locking wedges reduce twisting and combine with extended scalloped skirt to lock the liner at the top and bottom of the shell.

FIG. 2 is a cross-sectional view of the embodiment of teat liner of the present disclosure taken generally along line 2-2 of FIG. 1. The head is comprised of mouth opening 112 and vacuum chamber 111 which is the area between the mouth and the barrel. An upper seal is formed between the head and shell 200 (see FIG. 4) so that when teat liner 100 is properly seated within a shell an air tight seal is achieved. A generally cylindrical skirt 118 extends downwardly from lip 114 of the head. Skirt 118 defines a circular slot 119 with barrel sidewall 126. Circular slot 119 is adapted to frictionally receive the top end 202 of shell 200 (see FIG. 4). The lower end of the short milk tube is configured to be connected to a milking claw (not shown). The liner is configured to accept a vacuum that is applied to the walls of the barrel so that vacuum channel 121 expands and contracts Milk flows through milk channel 131 within the liner and exits through exit orifice 139 into the milking claw for collection. Teat liner 100 is a tubular member formed from a flexible, resilient elastomeric material, such as a natural or synthetic rubber composition, or a silicone composition. In a preferred embodiment, teat liner 100 is a one-piece molded construction, although it is envisioned that the present disclosure may be formed as a multi-piece unit.

Figure 7:
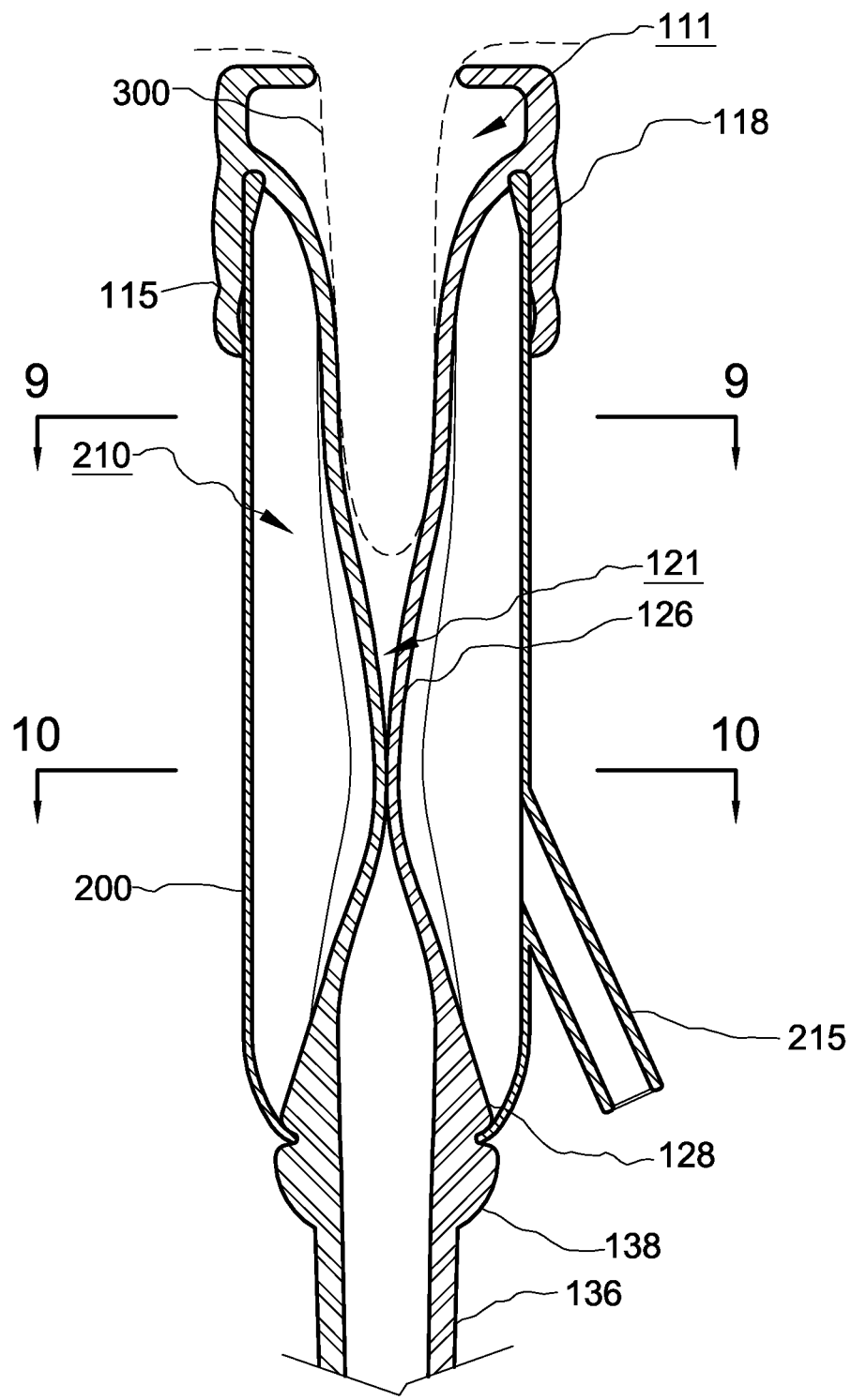
FIG. 7 shows a cross-sectional view of the embodiment of teat liner showing the teat liner within a shell in a collapsed condition and charged with a teat.

The head is annular in shape and forms a collar projecting outwardly from the barrel. The head has a mouth opening 112 defined by lip 114 that extends circumferentially about mouth opening 112. The head is further equipped with a skirt 118 having a concave cross-sectional profile proximate its distal end. The barrel is configured to have an oval, or elliptical, cross-section for non-standard collapse of the barrel during vacuum milking. Vacuum milking is achieved when the pressure inside the barrel is significantly less than the pressure outside the barrel thereby causing the barrel to collapse from a uncollapsed (or expanded) condition (as shown in FIG. 4) to a collapsed position (as shown in FIG. 7). Vacuum pressure is cycled to generate a pulsating effect causing the barrel to rhythmically alternate between uncollapsed and collapsed states. This rhythmic pulsation massages the teat of an animal, alternatively opening and closing the sphincter valve on the teat end while the internal vacuum within the liner draws milk from the teat into vacuum channel 121 of the barrel where it is then drawn through milk channel 131 and out exit orifice 139 of the short milk tube before being ultimately collected at a milking claw of an automatic milking machine. Vent 132 located on the short milk tube draws air into the liner to increase the flow of milk into the claw. Although the short milk tube is shown to include vent 132, it is known in the art the liners can be prepared to have short milk tubes lacking a vent.

Figure 3:
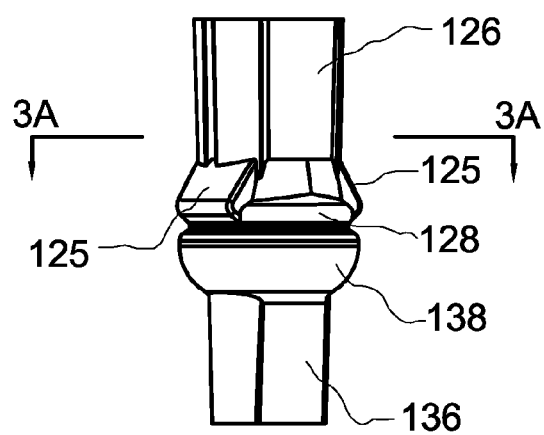
FIG. 3 is an expanded view of the upper and lower hackles of one embodiment of a teat liner of the present disclosure.

FIG. 3 is an expanded view of the upper and lower hackles of one embodiment of a teat liner showing the locking wedges of the upper hackle which provides for improved liner stability and reduces liner twisting. When assembled with a shell, lower hackle 138 situated on the short milk tube is pulled or otherwise drawn through the lower orifice of the shell such that the shell becomes lodged between lower hackle 138 and upper hackle 128. (See FIGS. 4 and 5). Upper hackle 128 has a curved lower surface to provide maximum surface contact with the curved profile of a shell. Locking wedges 125 provide additional surface area between upper hackle 128 and a shell. The additional surface area provided by locking wedges 125 that comes in contact with the shell's internal wall increases the amount of friction between the liner and shell thereby reducing the twisting of barrel sidewall 126 during a milking operation. The perspective view of the locking wedges 125 depicted in FIG. 3 clearly shows that upper hackles 128 are positioned between locking wedges 125. The spacing relationship between the hackles and the locking wedges is further illustrated in the cross-sectional views depicted in FIGS. 5 and 5A.

FIG. 3A is a cross-sectional view of the embodiment of teat liner of the present disclosure taken generally along line 3A-3A of FIG. 3. Two resilient locking wedges 125 are arranged generally spaced apart and parallel to each other. Locking wedges assist the user when inserting the liner in a shell, as the locking wedges prevent accidently pulling the barrel through the lower orifice of the shell. A standard liner having a barrel without locking wedges can be easily pulled through shell if too much force is applied while inserting the liner into a shell. In the instant embodiment, the locking wedges act as a stopper against the inner wall of the shell so as to withstand any undue force applied during insertion.

FIG. 4 shows a cross-sectional view of the teat liner with the barrel in an uncollapsed condition disposed within shell 200. In order to insert the teat liner within shell 200, the milk tube is inserted through the interior of shell 200 until it extends through shell opening 204. The short milk tube is pulled or forced through shell opening 204 such that lower hackle 138 passes through opening 204 while upper hackle 128 remains within the interior of shell 200 with upper hackle 128 being further secure by locking wedges 125. An upper seal is formed between the head and shell 200 so that when the teat liner is properly seated within shell 200 an air tight seal is achieved. A generally cylindrical skirt 118 extends downwardly from lip 114 of the head. Skirt 118 defines a circular slot 119 (see FIG. 2) with barrel sidewall 126 where circular slot 119 is adapted to frictionally receive the top end 202 of shell 200.

The barrel includes a barrel sidewall 126 having an outer wall spaced inwardly from the internal surface of shell 200 to define an annular pulsation chamber 210. Shell 200 is constructed of a suitable rigid material such as a metal, including stainless steel, or a thermoplastic or thermosetting resin. Shell 200 is a hollow tubular body defining a longitudinal cylindrical passageway for receiving the teat liner. Shell 200 is further constructed with a pulsation port 215 integrally formed with the outer wall of the shell and in communication with pulsation chamber 210 created between the outer wall of the barrel and inner wall of the shell 210. Pulsation port 215 is connected, via suitable tubing (not shown), to communicate with a pulsator which alternates between sub-atmospheric pressure and atmospheric pressure to alternatively cause barrel sidewall 126 of the barrel 120 to collapse and expand for milking.

An animal's teat 300 is inserted into the teat liner by way of mouth opening 112 (as shown in FIG. 2) to pass within vacuum channel 121 of the barrel. The barrel is sized to have a vacuum channel with an internal diameter close to the outer diameter of teat 300 and a length greater than the teat when the liner is in an uncollapsed condition. Importantly, the barrel should be of sufficient length so that the teat is able to stretch its natural distance without becoming obstructed by upper hackle 128 when the teat liner is in a collapsed condition.

FIG. 5 shows an expanded cross-sectional view of the hackles of one embodiment of a teat liner forming a vacuum-tight seal with a shell. A lower airtight seal is created at shell opening 204 and is maintained between lower hackle 138 and upper hackle 128. FIG. 5 shows a view of the hackles of the liner in contact with the shell, whereas FIG. 5A shows a view rotated 90 degrees in relation to the liner depicted in FIG. 5. FIG. 5A shows the locking wedges in contact with the shell. Each top hackle 128 is positioned between each locking wedge 125. FIG. 5A shows an expanded cross-sectional view of the locking wedges of one embodiment of a teat liner forming a vacuum-tight seal with a shell. The two resilient locking wedges 125 are arranged generally spaced apart and parallel to each other and separated by top hackles 128 positioned between the locking wedges so that an airtight seal is further secured in by the added friction applied by locking wedges 125 contacting the shell.

FIG. 6 is an expanded view of scalloped skirt extension 117 of the head of one embodiment of a teat liner forming a vacuum-tight seal with a shell. Skirt 118 is configured with scalloped skirt extension 117 at the distal end of skirt 118 to form a suction chamber 113 between skirt 118 and shell 200. Together the added surface afforded by the extended length of the skirt with the suction formed by the circumscribing concave scalloped distal end of the skirt, securely seats the teat liner within shell 200 and works in conjunction with the two locking wedges to prevent twisting of the liner within the shell during use. The extended length allows for more of the skirt to contact the shell and create a greater friction between the skirt and the shell thereby reducing twisting at the top during milking. The suction cup effect creates a vacuum tight seal between the skirt and the shell and reduces water and other forms of contamination from entering the shell. An annular recess 115 is formed on the outside profile of the skirt for configuring the outside surface of the head to mate with a milk washing device such as a Jetter cup. Annular recess 115 improves the fit with most rubber typical liner washing devices such as a standard Jetter cup device used in the milking industry. Most Jetter Cup devices overlap the skirt and can pull the liner head off the shell when detaching, the recess on the outside surface of the skirt acts as a locating ring for the cup of a typical milk liner washing device to fit into, thus preventing the shell from detaching during washing.

FIG. 7 is a cross-sectional view of the embodiment of teat liner showing the teat liner within a shell in a collapsed condition and charged with a teat. The barrel is configured to quickly collapse about the teat in the collapsed position and then readily expand back to the uncollapsed position. When barrel sidewall 126 of the barrel collapses, teat 300 is massaged and elongated thereby causing a milking of the teat when the vacuum channel returns to the open position. The constant vacuum applied to the short milk tube draws the milk from the barrel through the short milk tube to be collected by a milk claw.

Figure 8:
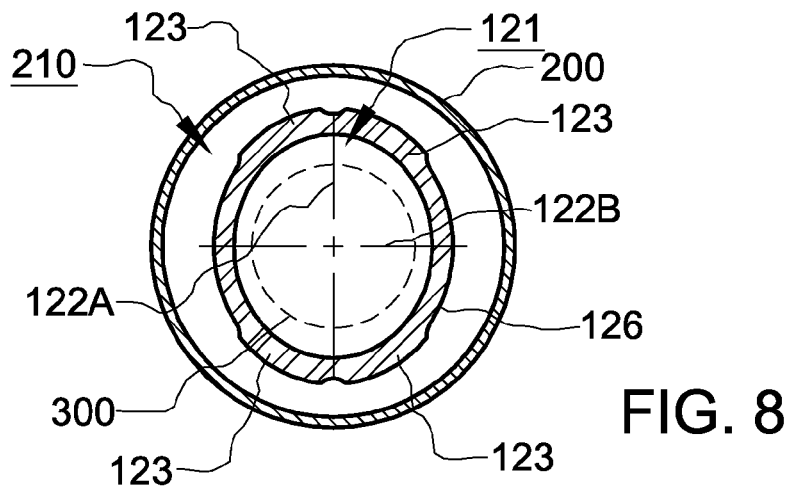
FIG. 8 is a cross-sectional view of the embodiment of teat liner of the present disclosure taken generally along line 8-8 of FIG. 4.
Figure 9:
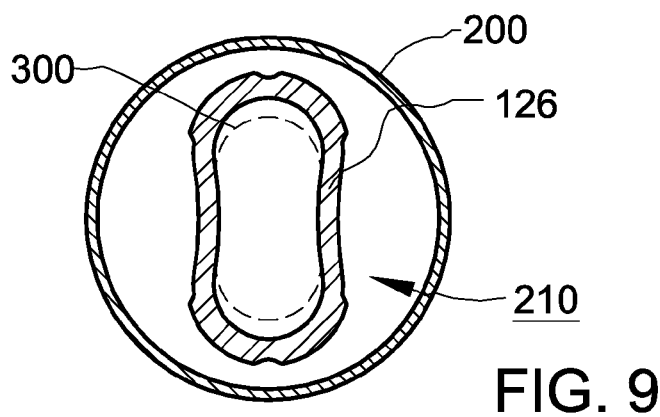
FIG. 9 is a cross-sectional view of the embodiment of teat liner of the present disclosure taken generally along line 9-9 of FIG. 7.
Figure 10:
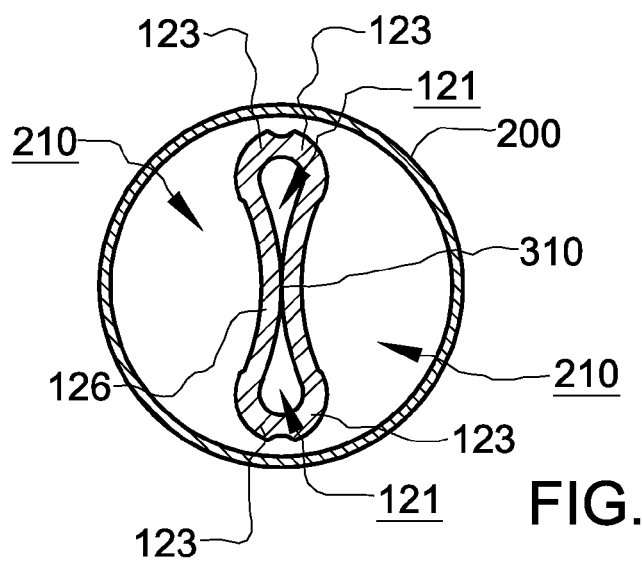
FIG. 10 is a cross-sectional view of the embodiment of teat liner of the present disclosure taken generally along line 10-10 of FIG. 7.

In order to generate a non-standard collapse of the barrel during milking operation, barrel sidewall 126 of the barrel is designed having an elliptical or oval cross-section as shown in FIGS. 8 through 10. The barrel is an elongated generally tubular barrel depending downwardly from the head, having a longitudinal major axis and a minor axis defining an elongated interior vacuum channel for receiving an animal's teat. The barrel is adapted to collapse inwardly along the minor axis from an open position. When the barrel vacuum channel is in the open position it has a generally oval cross-sectional shape defined by unreinforced barrel sidewalls which are interconnected by axially reinforced sidewall regions having a thickness greater than the thickness of the unreinforced sidewalls. The unreinforced barrel sidewalls run generally parallel to the major axis and collapse under vacuum to create a touch point and the thicker reinforced sidewalls run generally parallel to the minor axis resist collapse and maintain adjacent openings in the vacuum channel along the length of the barrel so that the vacuum can continue to feed the vacuum chamber. FIG. 8 is a cross-sectional view of the embodiment of teat liner of the present disclosure taken generally along line 8-8 of FIG. 4. FIG. 8 shows the teat liner in an uncollapsed condition. Barrel 120 includes a barrel sidewall 126 with an elliptical cross-section having a major axis 122A and a minor axis 122B defining vacuum channel 121. Reinforced sidewall regions 123 extend generally from vacuum chamber 111 to upper hackle 128 (as shown in FIGS. 1 and 2). The oval barrel has a greater internal diameter across the major axis than a traditional round barrel so that is able to accommodate a wider range of teat sizes.

FIG. 9 is a cross-sectional view of the embodiment of teat liner of the present disclosure taken generally along line 9-9 of FIG. 7. FIGS. 9 and 10 show the thinner sidewalls running generally parallel to the major axis. When the vacuum causes the walls to move together the thicker, reinforced sidewalls running generally parallel to the minor axis resist collapse. Because of the reinforced sidewalls regions 123 of barrel sidewall 126, vacuum channel 121 maintains a void up the side of the barrel (FIG. 10) so that the vacuum can continue to feed the vacuum chamber.

FIG. 10 is a cross-sectional view of the embodiment of teat liner of the present disclosure taken generally along line 10-10 of FIG. 7 in a collapsed condition The sidewall segments are movable between uncollapsed and collapsed condition. Touch point 310 is an engineered collapse point. The barrel wall movement occurs primarily within the section of thinner sidewalls 126 making the transition from oval to a collapsed touch point and back to oval during the milking process. While the thinner walls transition from open to closed the reinforced sidewall regions 123 resist collapse delaying the barrel from fully closing, maintaining a vacuum in open air channels 121 up the sides of the barrel past the teat feeding the vacuum chamber resulting in greater stability and less slip when the liner barrel is collapsed. The movement that the sidewalls make from collapsed to open is a shorter distance than with a traditional barrel liner. The thinner walls of the oval barrel will open faster to restore a full vacuum on the teat quicker because of the shorter distance that walls travel from collapsed to open, thereby resulting in faster milking than a typical round barrel.

FIG. 11 is a side view of the short milk tube of a preferred embodiment of a teat liner exiting shell 200 with the distal end of the short milk tube bent at a generally 90 degree angle to the shell. Because of the oval external profile and rounded internal diameter, the short milk tube is allowed to bend in the natural direction of a milk cluster without crimping the flow passage of the tube. The milk tube is configured with notches or hinge points so that the head of the liner can be bent at 90 degrees without the short milk tube collapsing. The thicker ribs running down the length of the tube are designed to compress without collapse so that the tube can be compressed in an oval-shaped internally. Reinforcing members 133 form a broken compression rib which runs down the length of the tube and are arranged to permit substantial angular bending of the short milk tube relative to the axis of the barrel for attachment to a milk claw without substantial crimping which causes a reduction in the flow passage. Reinforcing members 133 divide the short milk tube into three sections allowing each section to bend independently improving cluster alignment on a larger range of animals with variations of teat spacing. The reinforcing members allow the short milk tube to bend without collapsing and to change shape from round to oval without restricting volume. The variation of the wall thickness around the diameter of the short milk tube allows the tube to be more flexible and manageable at the top near the hackle and at the bottom of the short milk tube near the bumper due to the thinner walls near the notches. This configuration allows for improved movement of the short milk tube relative to the cluster alignment (top) and for shut off after unit detachment (bottom). At least two notches or hinge points 134 interrupt the continuity of the rib thereby creating the reinforcing members. The reinforcing members, along with the notches or hinge points allow the milk tube to bend in the direction of a milk cluster and are designed to compress short milk tube wall 136 without collapsing or kinking. The short milk tube with the compression ribs does not restrict milk flow as the tube bends. A short milk tube without the compression rib for reinforcement is prone to losing its opening after repetitive bending because short milk tube walls have to be soft enough to allow for flexible movement, however after multiple bending movements the typical milking liner will collapse and kink and disrupt the milking process. Further softening and kinking of a conventional short milk tube is also promoted by continuous contact with hot water during cleaning cycles. The milk liner of the instant disclosure avoids this problem by implementing compression ribs with hinge points that act in concert with soft liner walls without losing the continuity of the milk tube. The reinforced walls avoid the common problem of a collapsing tube after multiple bending movements.

FIG. 12 is a cross-sectional view of the short milk tube of a preferred embodiment of teat liner of the present disclosure taken generally along line 12-12 of FIG. 11 showing internal circular shape of the end of the short milk tube. As shown in FIG. 12, the short milk tube is comprised of a short milk tube wall 136 configured to form an oval shaped external profile and round internal through-bore. The internal opening at this point of the short milk tube maintains its essentially circular shape even when the tube is bent because of its position at the end of the tube relative to bumper section 135. Although not shown in the drawings, milk exits the short milk tube through exit orifice 139 and is received by a milk claw that is inserted into exit orifice 139. It is preferred that the milk claw is inserted into the short milk tube to support the internal cavity and maintain the circular shape of the interior of the short milk tube.

FIG. 12A is a cross-sectional view of the short milk tube of a preferred embodiment of teat liner of the present disclosure taken generally along line 12A-12A of FIG. 11 showing the oval shape of the interior a bent short milk tube. As shown in FIG. 12A, compression of short milk tube wall 136 distorts the round internal through-bore to a more generally elliptical cross-section. Thus, an uninterrupted vacuum is applied to the milk channel 131 and vacuum channel 121 to permit continuous extraction of milk from the barrel through the short milk tube and collection at the milk claw. Additionally, vacuum is maintained at the teat thereby reducing the chance of the teat becoming dislodged during milking.

FIG. 12B is a cross-sectional view of the short milk tube of a preferred embodiment of teat liner of the present disclosure taken generally along line 12B-12B of FIG. 11 showing the oval shape of the interior a bent short milk tube. This interior view of the short milk tube near the hackle shows how the tube exterior and interior takes an exaggerated oval shape when the tube is bent to accommodate a position favorable for attachment to a milk claw.

FIG. 13 is a side view of a preferred embodiment of a teat liner of the present disclosure showing the milk tube of the teat liner exiting a shell. It should be understood that the liner of the instant disclosure is symmetrically consistent on both sides and the reverse side of the liner depicted in the figure is a minor image having identical compression ribs and all elements depicted in FIG. 13. Bumper section 135 is a reinforced ring design configured so that when the liner is inserted into a milk claw it is able to withstand undue force and prevent claw puncture. In the preferred embodiment of the instant disclosure the short milk tube has a tapered internal diameter that increases in size as it moves away from bumper section 135.

FIG. 14 is a cross-sectional view of the short milk tube of a preferred embodiment of teat liner of the present disclosure taken generally along line 14-14 of FIG. 13 showing the wall thickness, diameter of the opening, width and thickness of the compression rib of the short milk tube in a location proximate bumper section 135. The diameter of the opening of the short milk tube is depicted by arrow 144, and the thickness of compression rib 133 is depicted by arrow 142, and the width of compression rib 133 is depicted by arrow 140. The diameter of the milk tube opening depicted by arrow 144 is at about its narrowest dimension. The interior of the milk tube increases in diameter as it moves away from the bumper section. The compression ribs are tapered and increase in width as the ribs move away from the bumper section towards the hackle but the thickness of the compression ribs remains constant throughout the short milk tube. The thickness of short milk tube wall 136 is depicted by arrow 162 and is greater in thickness than short milk tube wall 136 depicted by arrows 154 and 146 in FIGS. 14A and 14. The thickness of short milk tube wall 136 as depicted by arrows 146, 154 and 162 is less than a typical milk liner and configured so that the short milk tube is soft and flexible for bending in the direction of the claw. Compression ribs 133 work in combination with the thin short milk tube wall 136 to permit the short milk tube to bend in excess of 90 degrees while resisting kinking and flattening of the short milking tube. For optimal performance the short milk tube orientation in relation to the claw should be as shown in FIG. 11 with short milk tube wall 136 positioned on the top and bottom of the tube and compression ribs 133 to the side permitting maximum flexibility and bending of the tube in the direction of the cows udder during milking and away from the cows udder when not attached to the cow in the shut off position. The short milk tube illustrated in FIG. 11 is a minor image of the other side of the short milk tube which has corresponding adjacent identical ribs 133 such that a symmetrical configuration exists along the outer surface of the short milk tube. Even though the short milk tube is configured to bend in any direction relative to the barrel, the preferred directional bending of the short milk tube occurs along short milk tube wall 136 relative to the ribs as depicted in FIG. 11.

FIG. 14A is a cross-sectional view of the short milk tube of a preferred embodiment of teat liner of the present disclosure taken generally along line 14A-14A of FIG. 13 showing the wall thickness, diameter of the opening, width and thickness of the middle compression rib of the short milk tube. The diameter of the opening of the short milk tube is depicted by arrow 152, and the thickness of compression rib 133 is depicted by arrow 150, and the width of compression rib 133 is depicted by arrow 148. The diameter of the short milk tube opening depicted by arrow 152 is at about somewhere between the diameter dimensions depicted in FIGS. 14 (arrow 144) and 14B (arrow 160). The thickness of short milk tube wall 136 is depicted by arrow 154 and is about the same thickness as short milk tube wall 136 depicted by arrow 146 in FIG. 14. The thickness of the wall in middle of the short milk tube allows for bending and positioning of the short milk tube relative to a milk claw.

FIG. 14B is a cross-sectional view of the short milk tube of a preferred embodiment of teat liner of the present disclosure taken generally along line 14B-14B of FIG. 13 showing the wall thickness, diameter of the opening, width and thickness of the compression rib of the short milk tube in a location proximate the hackle. The thickness of short milk tube wall 136 depicted by arrow 162 is somewhat thicker than the thickness of the short milk tube wall depicted in FIGS. 14 (arrow 146) and 14A (arrow 154). By configuring the liner to have a somewhat thicker wall near the shell allows for greater durability and strength of the liner and less bending and twisting near the shell. The diameter of the opening of the short milk tube is depicted by arrow 160, and the thickness of compression rib 133 is depicted by arrow 158, and the width of compression rib 133 is depicted by arrow 156. The diameter of the milk tube opening depicted by arrow 160 is at about its widest dimension. The preferred embodiment of the short milk tube of the instant disclosure has a tapered internal diameter from about 10.0 mm to 13.0 mm so in effect increases by 30 percent, however the area inside the tube increases by approximately 70 percent if we consider the area at a fixed point. For example the area of a 10.0 mm circle is $(3.14\times(5\times5))=78.5$ compared to the area of a 13.0 mm circle $(3.14\times(6.5\times6.5))=132.7$ {$132.7-78.5=54.2/78.5=69$ percent}. The compression ribs increase in width in relation to the area of the short milk tube not the internal diameter. It is envisaged that this relationship between the compression rib width and the area of the short milk tube will be used in the range of 0 to 100 percent where 0 represents a short milk tube with a parallel internal diameter and a compression rib width that remains constant and 100 percent represents the maximum tapered increase in the short milk tube area corresponding to a 100 percent increase in the width of the compression rib, and that examples of both exist within the current range of industry standards.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

What is claimed is:

1. A milking teat liner for use with a teat cup assembly including a rigid shell as part of the teat cup assembly comprising:
   a head having a mouth opening and a generally cylindrical skirt having an inner surface and an outer surface said skirt depending downwardly from said mouth opening,
   a barrel depending downwardly from said head, said barrel extending axially along an axis for receiving a teat inserted axially thereinto through said mouth opening of said head, said barrel having a barrel wall wherein said barrel wall acts with said inner surface of said skirt to define a circular slot adapted to frictionally receive the shell; wherein said barrel wall has a reinforced sidewall regions that protrudes on an external surface of the liner to frictionally receive the shell;
   wherein a percentage of a total sidewall that is reinforced is substantially similar to a percentage of the total sidewall that is unreinforced;
   a scalloped skirt extension distal to said mouth opening to form a suction chamber between said skirt and said shell to increase friction between the skirt and the shell, to prevent twisting of the liner within the shell during use, and to reduce contaminants from entering the shell; wherein the suction chamber is a ring-shaped concave portion at an end of the skirt distal to said mouth;

wherein said concave portion is on an inner surface of said skirt adjacent the shell, and a short milk tube depending downwardly from said barrel.

2. The milking liner of claim 1 further comprising at least one locking wedge mounted to a lower end of said barrel wall proximate said short milk tube and located directly above a lower hackle; wherein said at least one locking wedge has a generally curved portion extending axially relative to an upper hackle and having a generally flat surface extending between said generally curved portion and said barrel to a point on said barrel above said upper hackle; wherein said upper hackle and a lower hackle are close in proximity such that the shell is in contact with both the upper hackle and lower hackle when in position on the barrel; wherein said at least one locking wedge provides additional surface area between the milking liner and the shell.

3. The milking liner of claim 2 wherein said head further comprises an annular recess on said outer surface of said skirt that acts as a locating ring for a cup of a typical milk liner washing device.

4. The milking liner of claim 2 comprising two locking wedges mounted to said barrel wall proximate said short milk tube for locking said liner in position within said shell.

5. A milking teat liner for use with a teat cup assembly including a rigid shell as part of the teat cup assembly comprising:

a head, a barrel depending downwardly from said head, said barrel extending axially along an axis for receiving a teat inserted axially thereinto through said head, said barrel being defined by a barrel wall having an outer surface area with at least one locking wedge mounted to a lower end of said barrel wall proximate a short milk tube and located directly above a lower hackle; wherein said at least one locking wedge has a generally curved portion extending axially relative to an upper hackle and having a generally flat surface extending between said generally curved portion and said barrel to a point on said barrel above said upper hackle; wherein said upper hackle and the lower hackle are close in proximity such that the shell is in contact with both the upper hackle and lower hackle when in position on the barrel; wherein said locking wedge provides additional surface area between the milking liner and the shell, and the short milk tube depending downwardly from said at least one locking wedge of said barrel.

6. A milking teat liner for use with a teat cup assembly including a rigid shell as part of the teat cup assembly comprising;

a head, a barrel depending downwardly from said head, said barrel extending axially along an axis for receiving a teat inserted axially thereinto through said head, said barrel having an upper end and a lower end;

a short milk tube with a generally oval outer surface and a rounded internal flow passage depending downwardly from said lower end of said barrel;

at least one series of external compression ribs at a location below the lower end of the barrel extending along said outer surface of the short milk tube; wherein said at least one series of external compression ribs extend down a majority of a length of the short milk tube; wherein said external compression ribs are positioned generally equidistant from each other on the sides of the short milk tube; wherein the width of each series of external compression ribs is varied at different points around a circumference of the short milk tube, wherein each series of external compression ribs decrease in circumferential width as each external compression rib depends downwardly from said barrel; wherein said short milk tube has a tapered internal diameter that increases in size as it moves away from a bumper section; wherein the external compression ribs are tapered and increase in width as the ribs move away from the bumper section towards a lower hackle but a thickness of the external compression ribs remains generally constant throughout the short milk tube; said external compression ribs being arranged to permit substantial angular bending of said short milk tube relative to said axis of said barrel for attachment to a milk claw without substantial crimping which causes a reduction in said flow passage; wherein said external compression ribs contain hinge points to allow the short milk tube to bend at least 90 degrees without collapsing.

7. A milking liner of claim 6 wherein at least one series of external compression ribs is a series of three external compression ribs that decrease in thickness as each external compression rib depends downwardly from said barrel.

8. The Milking liner of claim 7 further comprising a second series of three external compression ribs that decrease in thickness as each external compression rib depends downwardly from said barrel wherein the second series of three external compression ribs is substantially a mirror image of a first series of three external compression ribs such that a symmetrical configuration exists along the outer surface of the short milk tube.

9. The milking liner of claim 8 further comprising at least two locking wedges mounted to a lower end of barrel wall proximate said short milk tube and located directly above a lower hackle; wherein at least two upper hackles are positioned between the locking wedges; wherein said locking wedges are arranged generally spaced apart and parallel to each other; wherein said locking wedges have a generally curved portion extending axially relative to said upper hackles and having a generally flat surface extending between said generally curved portion and said barrel to a point on said barrel above said upper hackle; wherein said upper hackle and the lower hackle are close in proximity such that the shell is in contact with both the upper hackle and lower hackle when in position on the barrel; wherein said locking wedges provide additional surface area between the milking liner and the shell for locking said liner in position within said shell, to reduce twisting, and to prevent the barrel from being accidentally pulled through a lower orifice of the shell.

10. The milking liner of claim 9 wherein said head further comprises an annular recess having a concave shape which extends inwardly to form a groove at a location on a skirt distal to a mouth of the skirt on said outer surface of said skirt that acts as a locating ring for a cup of a typical milk liner washing device.

11. The milking liner of claim 10 further comprising a scalloped skirt extension distal to a mouth opening to form a suction chamber between said skirt and said shell to increase friction between the skirt and the shell, to prevent twisting of the liner within the shell during use, and to reduce contaminants from entering the shell; wherein the suction chamber is a ring-shaped concave section at an end of the skirt distal to said mouth; wherein said concave section is on an inner surface of said skirt adjacent the shell.

12. A milking teat liner for use with a teat cup assembly including a rigid shell as part of the teat cup assembly used with vacuum operated automatic milking machines comprising;
   a head,
   an elongated generally tubular barrel depending downwardly from said head, having a longitudinal major axis and a minor axis defining an elongated interior vacuum channel for receiving an animal's teat; said barrel adapted to collapse inwardly along a minor axis from an open position, said barrel having in the open position, a generally oval cross-sectional shape defined by unreinforced sidewall regions which are interconnected by axially reinforced sidewall regions having a thickness greater than a thickness of said unreinforced sidewalls regions; wherein the reinforced sidewall regions protrudes on an external surface of the liner; wherein an internal surface of the liner is substantially smooth; wherein a percentage of a total sidewall that is reinforced is substantially similar to a percentage of the total sidewall that is unreinforced; wherein a material comprising said reinforced sidewall regions and said unreinforced sidewall regions is uniform; wherein a groove is centrally located on the external surface of said reinforced sidewall regions; the unreinforced barrel sidewalk regions running generally parallel to the major axis collapse under vacuum to create a touch point and the reinforced sidewall regions running generally parallel to the minor axis resist collapse and maintain adjacent openings in the vacuum channel along the length of the barrel so that the vacuum can continue to feed a vacuum chamber; and
   a short milk tube depending downwardly from said barrel.

13. The milking liner of claim 12 wherein said barrel has four longitudinal reinforced sidewall regions and four longitudinal unreinforced barrel sidewalls.

14. The milking liner of claim 13 wherein said barrel has two locking wedges mounted to said barrel.

15. The milking liner of claim 12 further comprising a first and a second series of three external compression ribs along an outer surface of the short milk tube that decrease in circumferential width as each external compression rib depends downwardly from said barrel and wherein the first series of three external compression ribs is substantially the mirror image of the second series of three external compression ribs such that a symmetrical configuration exists along the outer surface of the short milk tube.

16. The milking liner of claim 15 wherein said head further comprises an annular recess having a concave shape which extends inwardly to form a groove at a location on a skirt distal to a mouth of the skirt on an outer surface of said skirt that acts as a locating ring for a cup of a typical milk liner washing device.

17. A milking teat liner for use with a teat cup assembly including a rigid shell as part of the teat cup assembly comprising:
   a head having a mouth opening and a generally cylindrical skirt having an inner surface and an outer surface said skirt depending downwardly from said mouth opening, wherein said head further comprises an annular recess having a concave shape which extends inwardly to form a groove at a location on said skirt distal to a mouth of the skirt on said outer surface of said skirt that acts as a locating ring for a cup of a typical milk liner washing device,
   a barrel depending downwardly from said head, said barrel extending axially along an axis for receiving a teat inserted axially thereinto through said mouth opening of said head, said barrel having a barrel wall wherein said barrel wall acts with, said inner surface of said skirt to define a circular slot adapted to frictionally receive said shell, and
   a short milk tube depending downwardly from said barrel;
   at least two locking wedges mounted to a lower end of said barrel wall proximate said short milk tube and located directly above a lower hackle; wherein at least two upper hackles are positioned between the locking wedges; wherein said locking wedges are arranged generally spaced apart and parallel to each other; wherein said locking wedges have a generally curved portion extending axially relative to said at least two upper hackles and having a generally flat surface extending between said generally curved portion and said barrel to a point on said barrel above said at least two upper hackles; wherein said at least two upper hackles and a lower hackle are close in proximity such that the shell is in contact with both the at least two upper hackles and lower hackle when in position on the barrel; wherein said locking wedges provide additional surface area between the milking liner and the shell.

18. The milking liner of claim 17 further comprising a scalloped skirt extension distal to said mouth opening to form a suction chamber between said skirt and said shell to increase friction between the skirt and the shell, to prevent twisting of the liner within the shell during use, and to reduce contaminants from entering the shell; wherein the suction chamber is a ring-shaped concave section at an end of the skirt distal to said mouth; wherein said concave portion is on an inner surface of said skirt adjacent the shell.

19. A milking teat liner for use with a teat cup assembly including a rigid shell as part of the teat cup assembly comprising:
   a head having a mouth opening and a generally cylindrical skirt having an inner surface and an outer surface said skirt depending downwardly from said mouth opening, said head further comprises an annular recess having a concave shape which extends inwardly to form a groove at a location on said skirt distal to a mouth of the skirt on said outer surface of said skirt that acts as a locating ring for a cup of a typical milk liner washing device;
   a scalloped skirt extension distal to said mouth opening to form a suction chamber between said skirt and said shell to increase friction between the skirt and the shell, to prevent twisting of the liner within the shell during use, and to reduce contaminants from entering the shell; wherein the suction chamber is a ring-shaped concave section at an end of the skirt distal to said mouth; wherein said concave section is on an inner surface of said skirt adjacent the shell;
   an elongated generally tubular barrel depending downwardly from said head, having a longitudinal major axis and a minor axis defining an elongated interior vacuum channel for receiving an animal's teat; said barrel adapted to collapse inwardly along a minor axis from an open position, said barrel having in the open position, a generally oval cross-sectional shape defined by unreinforced barrel sidewall regions which are interconnected by axially reinforced sidewall regions having a thickness greater than a thickness of said unreinforced sidewalls regions; wherein the reinforced sidewall regions protrudes on an external surface of the liner; wherein an internal surface of the liner is substantially smooth; wherein a percentage of the total sidewall that is reinforced is substantially similar to a percentage of the total sidewall that is unreinforced; wherein a material comprising said reinforced sidewall regions and said unreinforced sidewall regions is uniform; wherein a groove is centrally located on the external surface of said reinforced sidewall regions; the unreinforced barrel sidewall regions running generally parallel to the major axis collapse under vacuum to create a touch point and the reinforced sidewall regions running generally parallel to the minor axis resist collapse and maintain adjacent openings in a vacuum channel along the length of the barrel so that a vacuum can continue to feed a vacuum chamber; and said barrel further comprising at least two locking wedges mounted to a lower end of said barrel wall proximate a short milk tube and located directly above a lower hackle; wherein at least two upper hackles are positioned between the locking wedges; wherein said locking wedges are arranged generally spaced apart and parallel to each other; wherein said locking wedges have a generally curved portion extending axially relative to said at least two upper hackles and having a generally flat surface extending between said generally curved portion and said barrel to a point on said barrel above said at least two upper hackles; wherein said locking wedges provide additional surface area between the milking liner and the shell;

the short milk tube with a generally oval outer surface and a rounded internal flow passage depending downwardly from said lower end of said barrel; and at least one series of external compression ribs at a location below and spaced from the lower end of the barrel extending along said outer surface of the short milk tube; wherein said external compression ribs extend down a majority of a length of the short milk tube; wherein said external compression ribs are positioned generally equidistant from each other on the sides of the short milk tube; wherein the width of each series of external compression ribs is varied at different points around a circumference of the short milk tube, wherein each series of external compression ribs decrease in circumferential width as each external compression rib depends downwardly from said barrel; wherein said short milk tube has a tapered internal diameter that increases in size as it moves away from a bumper section; wherein the external compression ribs are tapered and increase in width as the ribs move away from the bumper section towards a lower hackle, but a thickness of the external compression ribs remains generally constant throughout the short milk tube; said external compression ribs being arranged to permit substantial angular bending of said short milk tube relative to said axis of said barrel for attachment to a milk claw without substantial crimping which causes a reduction in said flow passage; wherein said external compression ribs contain hinge points to allow the short milk tube to bend at least 90 degrees without collapsing.

* * * * *

UNITED STATES PATENT AND TRADEMARK OFFICE
CERTIFICATE OF CORRECTION

PATENT NO.      : 9,288,962 B2
APPLICATION NO. : 13/667920
DATED           : March 22, 2016
INVENTOR(S)     : Steven Brent Priest Page 1 of 1

It is certified that error appears in the above-identified patent and that said Letters Patent is hereby corrected as shown below:

Title Page, item (57) the Abstract in its entirety is incorrect. Please replace with:

ABSTRACT

A milking teat cup liner including a rigid shell comprising a head portion having a skirt and a barrel housed within a shell. A shell liner with an oval tapered barrel and sidewalls having thinner longer axes and thicker shorter axes adapted to collapse inwardly along a minor axis from an open position while maintaining adjacent openings in the vacuum channel. The barrel has two locking wedges mounted to its outer surface to lock the liner in position. The liner has a short milk tube with a series of compression ribs running down its length, allowing it to compress without collapsing and to distort into an oval cross-section without closing the open internal tube. There are at least two notches between the compression ribs to allow the short milk tube to bend approximately 90 degrees relative to the liner without restricting milk flow to a milk claw.

Signed and Sealed this
Seventeenth Day of May, 2016

Michelle K. Lee
*Director of the United States Patent and Trademark Office*